United States Patent
Jones et al.

(10) Patent No.: US 9,739,954 B1
(45) Date of Patent: Aug. 22, 2017

(54) STRAIN RELIEF DEVICE FOR A FIBER OPTIC CONNECTOR

(71) Applicant: CORNING OPTICAL COMMUNICATIONS LLC, Hickory, NC (US)

(72) Inventors: Ashley Wesley Jones, Denton, TX (US); Andrey Nikolayevich Levandovskiy, St. Petersburg (RU); Brandon Andrew Barnes, Ft. Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/048,096

(22) Filed: Feb. 19, 2016

(51) Int. Cl.
    G02B 6/36    (2006.01)
    G02B 6/38    (2006.01)

(52) U.S. Cl.
    CPC ......... *G02B 6/3887* (2013.01); *G02B 6/3869* (2013.01)

(58) Field of Classification Search
    USPC ...................................... 385/76–78
    See application file for complete search history.

(56) References Cited

U.S. PATENT DOCUMENTS

| | | | |
|---|---|---|---|
| 5,418,874 A | 5/1995 | Carlisle et al. | |
| 5,425,119 A | 6/1995 | Lee et al. | |
| 6,325,549 B1 | 12/2001 | Shevchuk | |
| 6,390,688 B1 | 5/2002 | Lutzen et al. | |
| 6,600,858 B2 | 7/2003 | Lutzen et al. | |
| 6,726,373 B2 | 4/2004 | Lutzen et al. | |
| 7,003,869 B2 | 2/2006 | Lutzen et al. | |
| 2004/0067028 A1 | 4/2004 | Mleczko | |
| 2007/0127875 A1* | 6/2007 | Allen | G02B 6/3801 385/95 |
| 2007/0217745 A1 | 9/2007 | Semmler et al. | |
| 2010/0054669 A1 | 3/2010 | Dimarco | |
| 2010/0322568 A1* | 12/2010 | Zimmel | G02B 6/3885 385/81 |
| 2014/0321813 A1* | 10/2014 | Lu | G02B 6/3821 385/78 |

FOREIGN PATENT DOCUMENTS

| | | |
|---|---|---|
| EP | 0685750 A1 | 5/1995 |
| JP | 58171012 A | 10/1983 |
| JP | 2008241729 A | 10/2008 |
| JP | 5342262 B2 | 11/2013 |
| JP | 5841828 B2 | 1/2016 |

OTHER PUBLICATIONS

International Search Report and Written Opinion PCT/US2017/016825 Dated Apr. 7, 2017.

* cited by examiner

*Primary Examiner* — Eric Wong
(74) *Attorney, Agent, or Firm* — Adam R. Weeks (57) ABSTRACT

A fiber optic connector is described herein. The fiber optic connector includes a ferrule for supporting at least one optical fiber of a fiber optic cable, a ferrule holder from which the ferrule extends, a housing in which the ferrule holder is received, and a strain relief device at least partially located within the housing. The strain relief device has at least one resilient clamping member selectively applying a compressive force to at least a portion of the fiber optic cable. The strain relief device also has an actuator at least partially surrounding the ferrule holder, and used to place the at least one resilient clamping member into compressed contact with the fiber optic cable, thus retaining the fiber optic cable within the housing.

16 Claims, 10 Drawing Sheets

STRAIN RELIEF DEVICE FOR A FIBER OPTIC CONNECTOR

BACKGROUND

This disclosure generally relates to cable assemblies and components thereof, for example fiber optic cable assemblies. More particularly, the present disclosure relates to strain relief components within fiber optic connectors used to form fiber optic cable assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule held within a housing by a ferrule holder. Each of the ferrule, ferrule holder and housing are generally constructed from a relatively rigid material so that the fiber optic connector can withstand a variety of forces during handling and use without affecting the optical connection that may be or has been established. Having rigid components, however, presents design challenges elsewhere. For example, fiber optic cables upon which fiber optic connectors are installed are typically much less rigid than the connector bodies of the fiber optic connectors. The rapid transition from low stiffness to high stiffness may result in stress concentrations where the cable or portions thereof become fixed to rigid elements of the connector, such as the ferrule. In some cases, stress concentrations can cause optical attenuation (loss of signal strength) or mechanical degradation of the optical fiber.

To address the above-mentioned challenge, a fiber optic connector often includes a strain relief device within the housing. There is a desire for a new strain relief device and method that can accept and secure cables across a wide range of diameters with the same set of strain relief device components while inhibiting concerns of stress concentrations in the fiber or over- or under-compressing the fiber or cable.

SUMMARY

Embodiments of the present disclosure include fiber optic connectors. Other embodiments include a fiber optic cable assembly having a fiber optic connector according to an embodiment of the present disclosure. Fiber optic connectors of the present disclosure are designed to accept and secure fiber optic cables across a wide range of cable diameters with the same set of strain relief device components. Thus fiber optic connectors of the present disclosure inhibit concerns of stress concentrations while making the assembly process easier due to a reduction in components.

According to one embodiment, a fiber optic connector comprises a ferrule configured to support at least one optical fiber of a fiber optic cable, a ferrule holder from which the ferrule extends, a housing in which the ferrule holder is received, and a strain relief device at least partially located within the housing. The strain relief device comprises at least one resilient clamping member configured to selectively apply a compressive force to at least a portion of the fiber optic cable. The strain relief device also comprises an actuator at least partially surrounding the ferrule holder and being configured to place the at least one resilient clamping member into compressed contact with the fiber optic cable, thus retaining the fiber optic cable within the housing.

In some embodiments the at least one resilient clamping member comprises a base configured to be positioned substantially parallel with a longitudinal axis of the fiber optic cable. The base has a radially inner surface configured to face the fiber optic cable and a radially outer surface configured to face away from the fiber optic cable. A plurality of spring arms resiliently extends from the radially outer surface of the base. In some embodiments, the base also includes a plurality of protrusions extending from the radially inner surface, the plurality of protrusions being configured to contact the fiber optic cable.

According to some embodiments, the actuator comprises a sleeve at least partially surrounding the at least one resilient clamping member. The sleeve is configured to compress the at least one resilient clamping member against the fiber optic cable in response to rotation of the sleeve relative to the ferrule holder. In an embodiment, the sleeve comprises an internal actuation surface having two opposed elliptical portions such that a radius of the internal actuation surface varies.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DESCRIPTION

Various embodiments will be further clarified by examples in the description below. As an example, this description generally relates to a strain relief device and components thereof for use within a fiber optic connector to restrict strain in a fiber optic cable. The strain relief is used to secure a portion of the cable, such as an acrylate coating, buffer, or fan-out tube allowing for isolation of the optical fiber which mates into the ferrule. The strain relief is configured to secure the cable such that forces applied to the cable are not transmitted to the optical fiber, thus assisting with isolating the length of the fiber from strain caused by twisting or compression. In addition, axial loads are inhibited from damaging the fiber within the strain relief. The strain relief device may be designed to accommodate fiber optic cables with diameters across a wide range of sizes.

Figure 1:
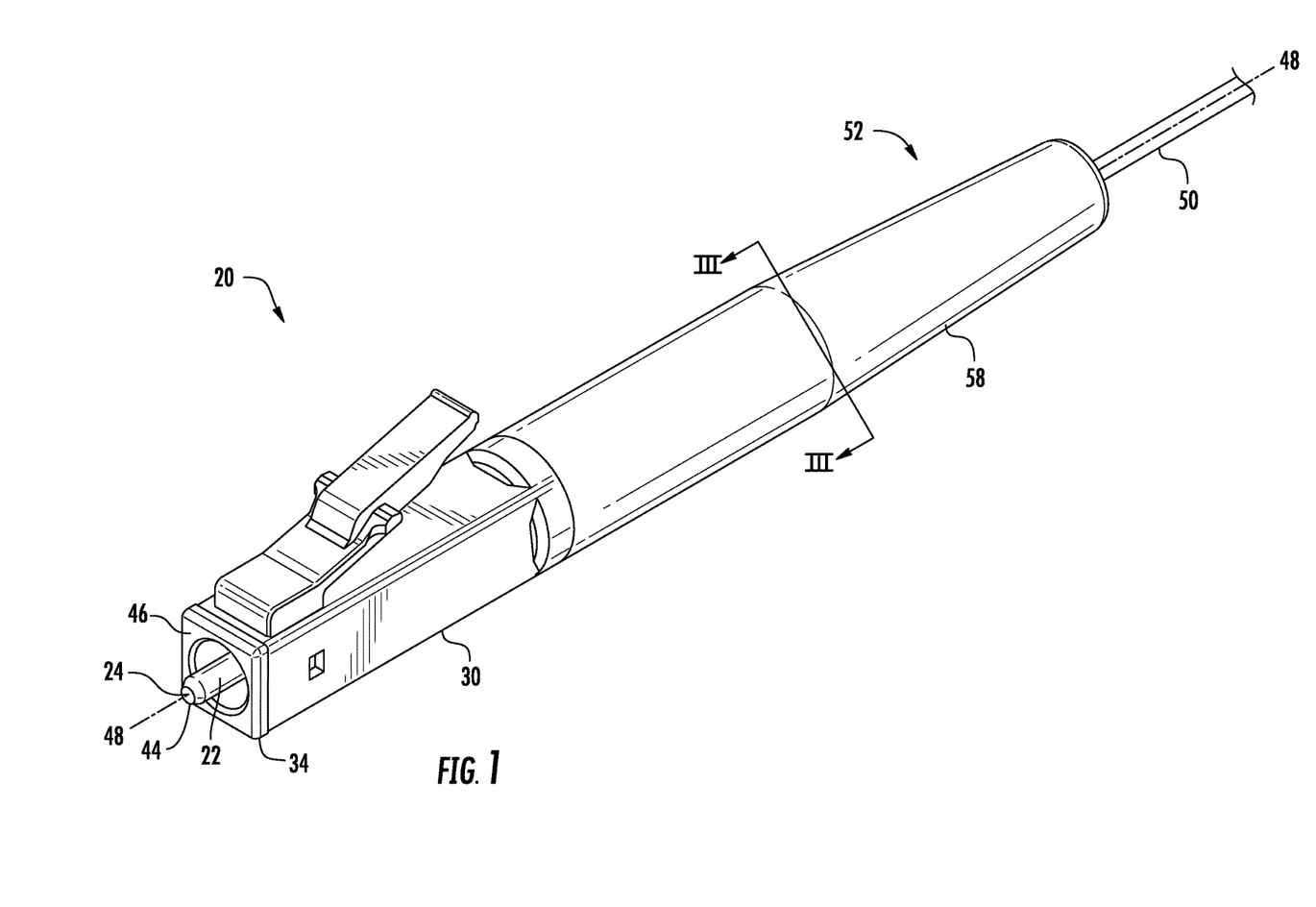
FIG. 1 is a perspective view of an example of a fiber optic connector.

One example of a fiber optic connector 20 (also referred to as "optical connector 20" or "connector 20") is shown in FIG. 1. Although the connector 20 is shown in the form of an LC connector, the features described below may be applicable to different connector designs. This includes at least ST and SC connectors, for example, and other single-fiber or multi-fiber connector designs.

Figure 2:
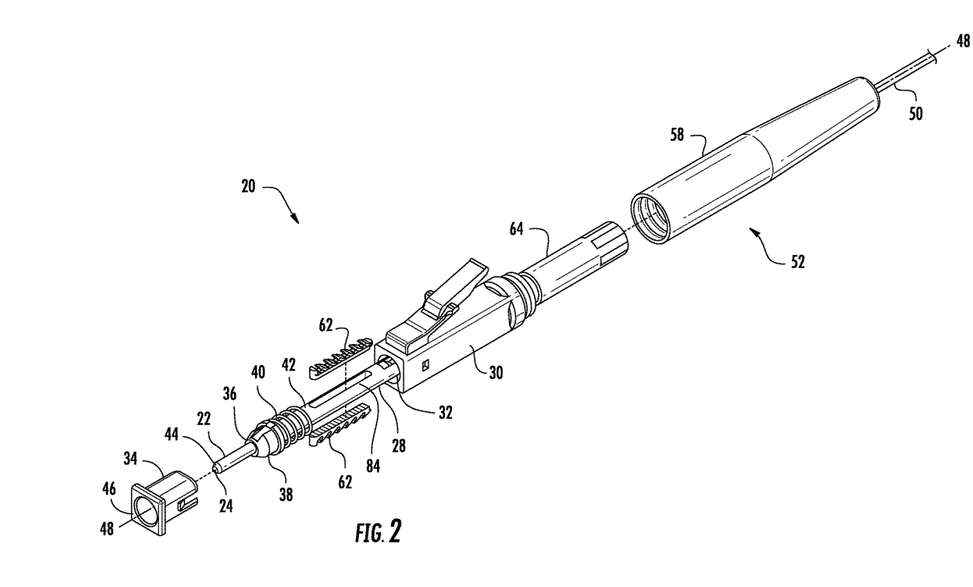
FIG. 2 is an exploded perspective view the fiber optic connector of FIG. 1.

As shown in FIGS. 1 and 2, the connector 20 includes a ferrule 22 having a ferrule bore 24 ("micro-hole") configured to support an optical fiber 26 (FIG. 3), a ferrule holder 28 from which the ferrule 22 extends, a housing 30 having a cavity 32 in which the ferrule holder 28 is received, and a cap 34 configured to retain the ferrule holder 28 within the housing 30. More specifically, a back end 36 of the ferrule 22 is received in a first portion 38 of the ferrule holder 28 and is secured therein in a known manner (e.g., press-fit, adhesive, and/or molding the ferrule holder 28 over the back end 36 of the ferrule 22, etc.). The ferrule 22 and ferrule holder 28 may even be a monolithic structure in some embodiments. For convenience, the term "ferrule assembly" may be used to refer to the combination of the ferrule 22 and ferrule holder 28, regardless of whether these elements are separate components secured together or different portions of a monolithic structure.

The ferrule holder 28 may be biased to a forward position within the housing 30 by a spring 40, which extends over a second portion 42 of the ferrule holder 28 that has a reduced cross-sectional diameter/width compared to the first portion 38. The spring 40 also interacts with internal geometry of the housing 30.

Figure 3:
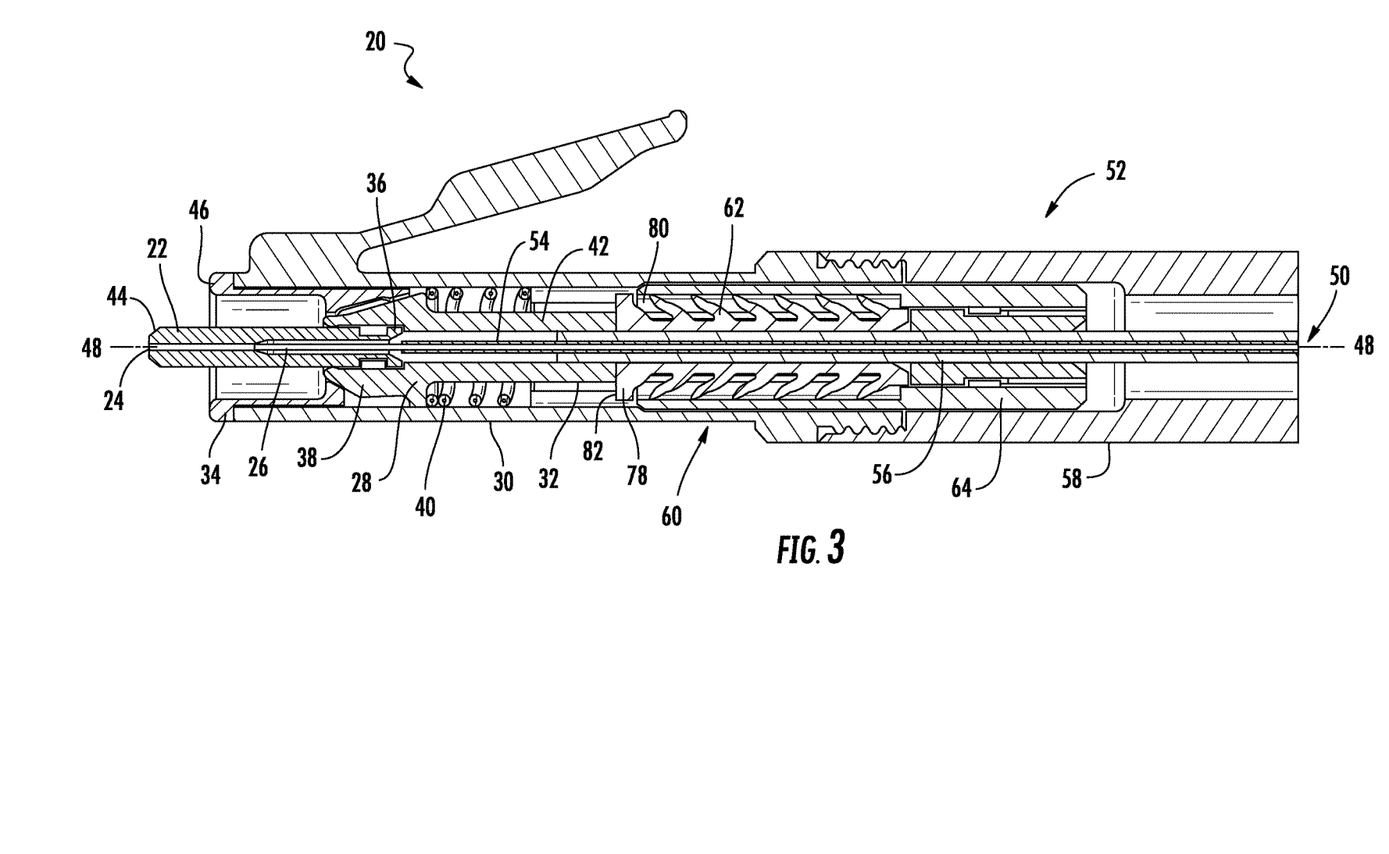
FIG. 3 is a cross-sectional view the fiber optic connector of FIG. 1.
Figure 11:
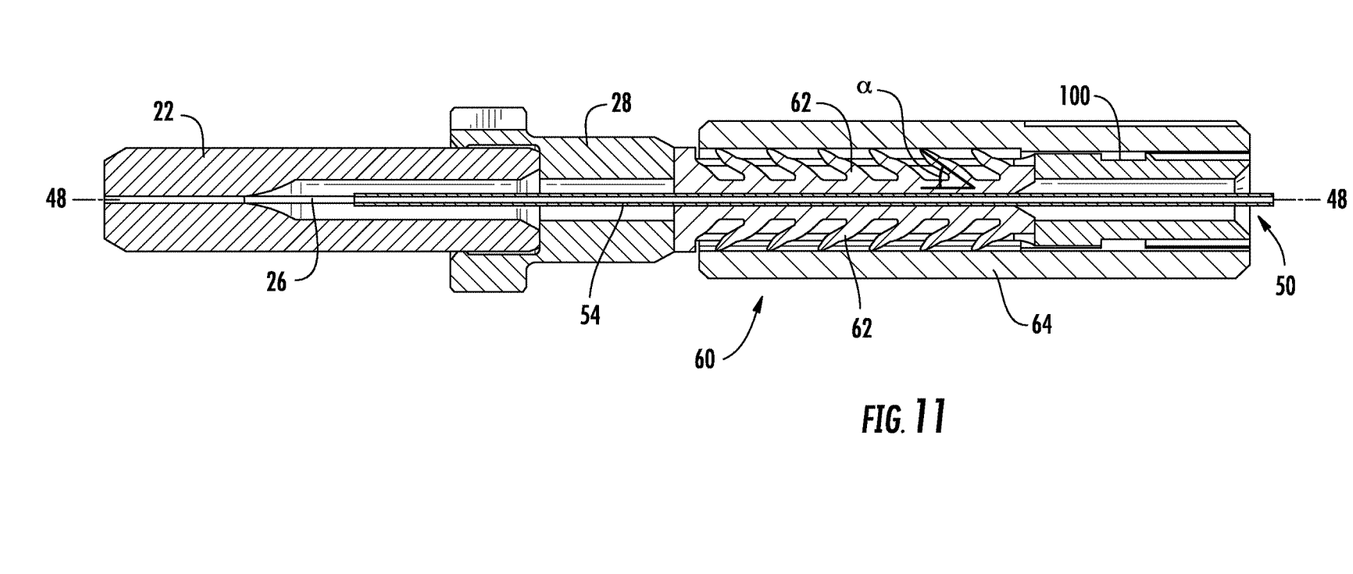
FIG. 11 is a longitudinal cross sectional view of the assembly of FIG. 8 in a clamped position around a relatively small cable.

When the connector 20 is assembled as shown in FIG. 1, a front end 44 of the ferrule 22 projects beyond a forward end 46 of the cap 34. The front end 44 presents the optical fiber 26 for optical coupling with a mating component (e.g., another fiber optic connector, transceiver, etc.; not shown). The ferrule 22 aligns the optical fiber 26 along a longitudinal axis 48. As used herein, the longitudinal axis 48 is used generically to describe the longitudinal axis of several components, each axis being understood to be generally coaxial when the connector 20 is assembled. The optical fiber 26 is provided as a part of a fiber optic cable 50 (hereinafter "cable 50"). The connector 20 can be installed on the cable 50 to form a fiber optic cable assembly 52. In the embodiment shown, the cable 50 includes the optical fiber 26, a coating 54, such as a UV cured acrylate coating, and a tight buffer 56, such as a plasticized PVC layer intimately attached to the coating 54. The cable 50 shown in FIG. 3 is merely an example, and other suitable fiber optic cables are within the scope of this disclosure. For example, the tight buffer 56 may be omitted (FIG. 11). In other embodiments, the tight buffer 56 may be replaced by a fan-out tube loosely surrounding the coating 54. In yet other embodiments, the cable 50 may have additional jacket layers outside of the tight buffer 56. The cable 50 may be further protected rearward of the housing 30 by a boot 58.

Variations of these aspects will be appreciated by persons skilled in the design of fiber optic cable assemblies. Reiterating from above, the features of the fiber optic connector 20 discussed above are general features provided as merely an example of a fiber optic connector 20 that may be used in association with the devices and methods described below. The general overview has been provided simply to facilitate discussion.

Figure 8:
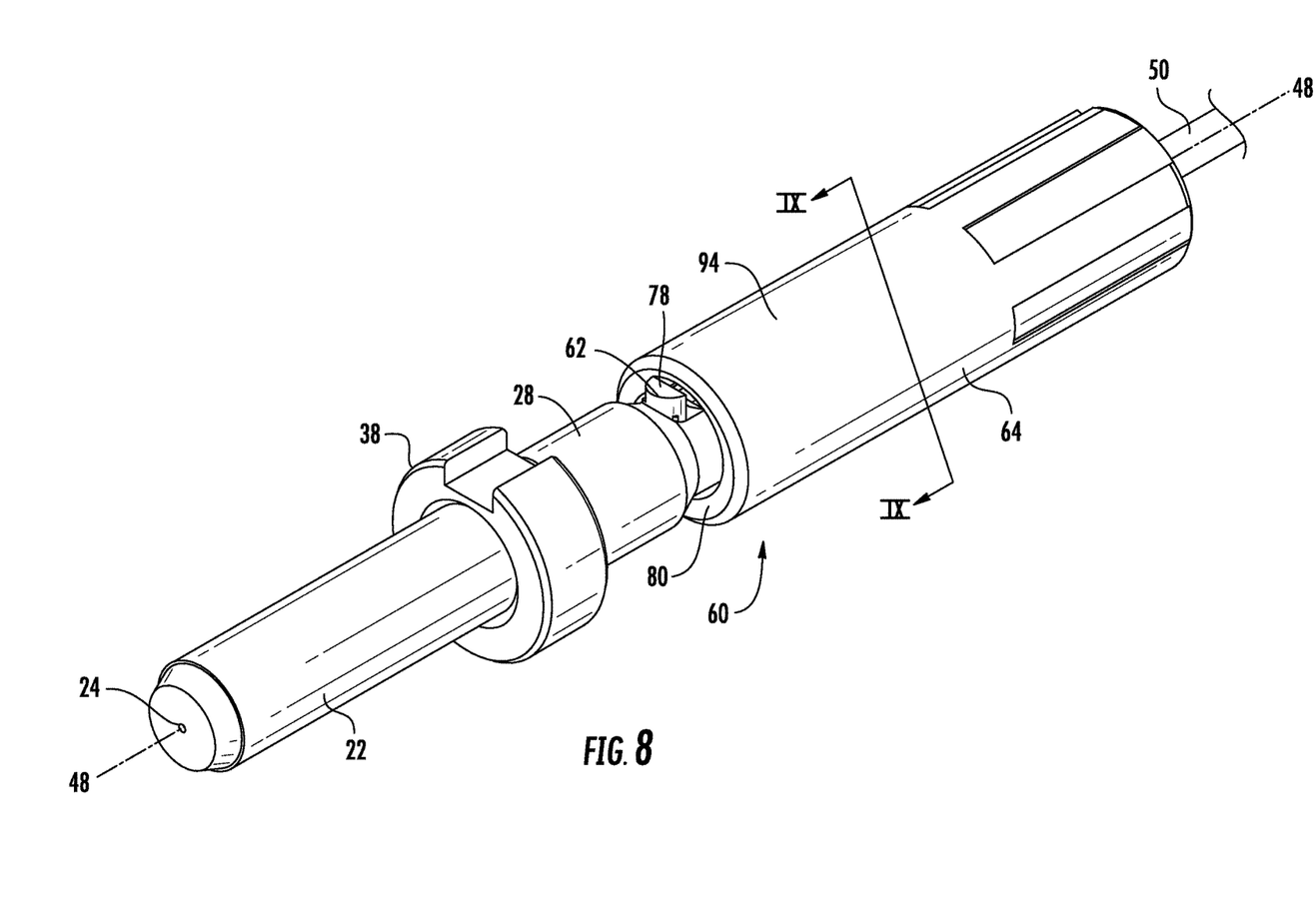
FIG. 8 is a perspective view of another partial assembly of the fiber optic connector of FIG. 1.

Beyond the general features discussed above, connectors 20 according to embodiments of the present disclosure may include a strain relief device 60, shown in FIGS. 3 and 8. The strain relief device 60 is configured to allow the connector 20 to retain the cable 50 within the housing 30, such as, for example, by using the tight buffer 56 (see FIGS. 3 and 12), or the coating 54 (see FIG. 11).

As shown in FIGS. 2 and 3, the strain relief device 60 includes a pair of diametrically opposed clamping members 62. More generally, the strain relief devices 60 may include at least one resilient clamping member 62 (also referred to as "clamping member 62"), as shown in detail in FIGS. 4 and 5. The clamping member 62 may be configured to selectively apply a compressive force, resulting in at least a friction fit, to at least a portion of the cable 50 in order to retain the cable within the housing 30 and inhibit strain upon the optical fiber 26. The clamping member 62 may be formed of thermoplastic materials such as polyetherimide or polycarbonate, or may be formed of other suitably resilient materials. Selection of materials may be based on factors such as cost, ability to achieve the functions described below, and the ability to manufacture the clamping member 62 to the small scales necessary to fit at least partially within the connector 20. The strain relief device 60 may also include an actuator 64 configured to place the resilient clamping member 62 into compressed contact with the cable 50. The strain relief device 60 is configured to capture cables 50, or portions thereof, having diameters within the range from about 200 um (e.g., capturing the coating 54) to about 900 um (e.g., capturing the tight buffer 56), a total range of about 700 um. The magnitude of the range is believed to be significantly larger than corresponding ranges for present mechanical strain relief techniques. To be suitable for use across a range of cable sizes and constructions, the strain relief device 60 is configured to substantially avoid both over-clamping of the cable 50, which can lead to signal attenuation, and under-clamping of the cable, which can result in an insufficient mechanical retention between the cable and the connector 20. Thus, for securing small cable diameters (e.g., about 200 um), radially inward translation of the clamping member 62 will be relatively large, and resilient deformation of the clamping member will be relatively slight (see, e.g., FIG. 11). In contrast, for securing relatively large cable diameters (e.g., about 900 um), radially inward translation of the clamping member 62 will be relatively slight, and resilient deformation of the clamping member will be relatively large (see, e.g., FIG. 12).

Figure 4:
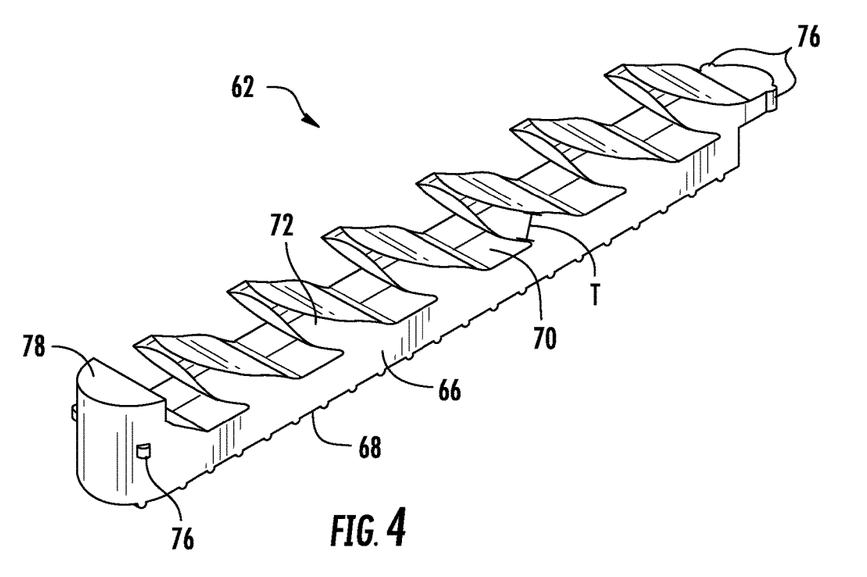
FIG. 4 is a radially outer perspective view of a resilient clamping member in accordance with an embodiment of this disclosure.
Figure 5:
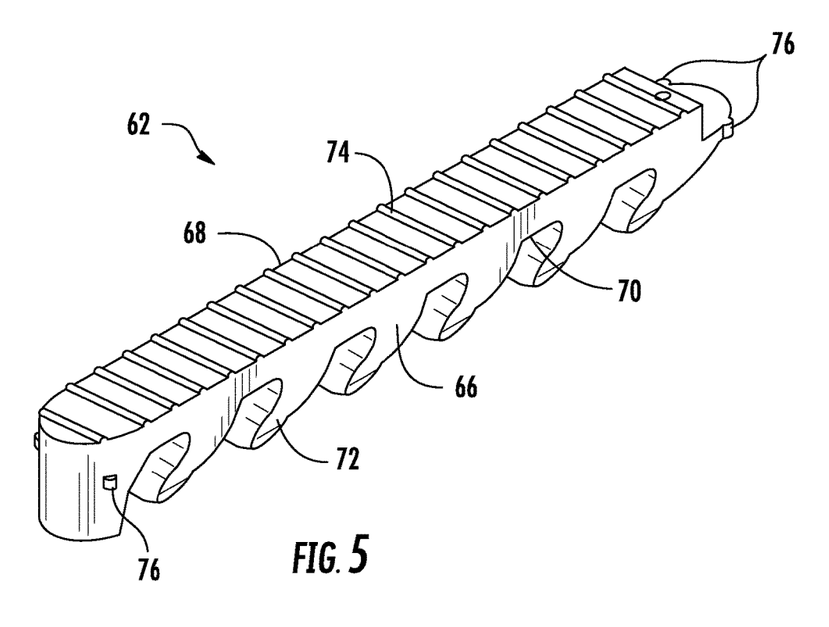
FIG. 5 is a radially inner perspective view of the resilient clamping member of FIG. 4.

The resilient clamping member 62, shown in FIGS. 4 and 5, may comprise a base 66 configured to be positioned substantially parallel with the longitudinal axis 48 of the cable 50. The base 66 may define a radially inner surface 68 configured to face the cable 50, and a radially outer surface 70 configured to face away from the cable. In some embodiments, the relative radial positioning of the surfaces 68 and 70 may be reversed. In one embodiment, a plurality of spring arms 72 may resiliently extend from the radially outer surface 70 of the base 66. In an uncompressed state (also referred to as an unclamped or pre-clamped state or position), the spring arms 72 may extend to an initial height $H_I$ (see FIG. 7) above the radially outer surface 70. The spring arms 72 are configured to be compressed or elastically deformed, e.g., bent, to a shorter height. In one embodiment the clamping member 62 may be about 7 mm long, about 1 mm wide and have a total height (including the height $H_I$ of the spring arms 72 and the thickness of the base 66) of approximately 1 mm. The resiliency of the spring arms 72 cause the spring arms to store elastic energy to provide a near constant force to the cable 50 while the clamping member 62 is in any one of a range of radial positions and the spring arms 72 accommodate a range of degrees of resilient deformation.

Referring again to FIG. 4, in one embodiment the clamping member 62 includes six spring arms 72, but the quantity of spring arms may be more or less than six. Each spring arm 72 may have a thickness T on the order of about 0.3 mm to about 0.5 mm. The thickness may vary, such as being thicker near the base 66 and thinner at a top end of each spring arm 72. With this configuration, the amount of plastic deformation may be minimized whereas the compression capability of the spring arms 72 is not believed to be reduced. The width of the spring arms 72 may stay constant in each spring arm, and may stay constant between spring arms of the same clamping member 62. In an embodiment, the spring arms 72 are each configured with a slight curvature.

In one embodiment, the spring arms 72 may be configured to have an initial position in which the spring arms extend obliquely from the radially outer surface 70 of the base 66. This oblique starting position may facilitate a substantially consistent bend direction and magnitude for each spring arm 72 for a given cable size. The spring arms 72 may form an initial angle $\alpha$ (see FIG. 7) with the base 66 of between about 30 and 85 degrees, where the angle may be measured from a ray passing through a tip of each spring arm 72 to compensate for the optional initial or final curvature of the spring arms. When compressed, the angle $\alpha$ decreases, possibly ending when the reduced angle $\alpha$ is within the range of about 5 degrees to about 60 degrees, depending upon the size of the cable 50 and the initial angle $\alpha$. In one embodiment, the reduced angle $\alpha$ is about 30 degrees when the clamping member 62 clamps a small cable 50 (see FIG. 11), and the reduced angle $\alpha$ is about 5 degrees when the clamping member 62 clamps a large cable (see FIG. 12). While the illustrated spring arms 72 are formed with an initial oblique angle $\alpha$ with respect to the base 66, other embodiments may result in the bending of spring arms that initially extend normal to the base 66. In yet other embodiments, the spring arms 72 may not bend very much if at all, because the spring arms may be configured to function as compression springs capable of being compressed in a direction normal to the base 66.

The deformation (e.g., compression) of the spring arms 72 is generally elastic in nature. In other words, at least some elastic deformation occurs to provide the compressive forces for retention of the cable 50. Some plastic deformation of the spring arms 72 may be acceptable, especially if the clamping member 62 is not intended for re-use.

As shown in FIG. 5, the clamping member 62 may further comprise a plurality of protrusions in the form of crosswise extending ridges 74 extending from the radially inner surface 68 that are configured to contact and help retain the cable 50. The ridges 74 are believed to increase the local material deformation and maximize surface area contact on the periphery of the cable 50, thus increasing overall retention. The ridges 74 may be of a size and shape such that they generally avoid both point loading of the coating 54 and allow relatively unimpeded cable insertion over the desired range of cable diameters.

In one embodiment, approximately seventy-three ridges 74 may be provided along the radially inner surface 68, which has a length of approximately 7 mm. The shape, height, location and quantity of ridges 74 may be selected to increase the retention by rendering the radially inner surface 68 rough enough to maximize cable retention for a given compression distance, while avoiding optical attenuation.

To provide sufficient roughness, the ridges 74 may be relatively sharp, for example, each ridge 74 may be a partial (e.g., half) cylinder with a radius of about 50 um. The height of the ridges 74 may be made small, e.g., about 10 um, to avoid impeding cable insertion or damaging portions of the cable 50. In many embodiments, the ridges 74 are located symmetrically along the radially inner surface 68. With respect to the number of ridges 74, particularly the density of the ridges on the radially inner surface 68, the mechanical retention may be less than desired if the number of ridges is either too small (i.e., the radially inner surface is not rough enough) or too large (i.e., the influence of the neighboring ridges may partially cancel each other's mechanical retention contribution due to the lack of local deformation of the cable 50, e.g., the tight buffer 56). While the ridges 74 are shown in FIG. 5 as extending across the width of the clamping member 62, alternative configurations are also considered where the ridges are less elongated.

The clamping member 62 may be formed with one or more stops 76 projecting from the periphery of the clamping member as seen in FIG. 4. The stops 76 increase the footprint of the clamping member 62 and may help position the clamping member in the pre-clamped or unclamped position. The actuator 64 is expected to overcome any resistance provided by the stops 76 to force the clamping member 62 into the clamping position, as will be discussed further below. In one instance, the stops 76 may be deformed or sheared off as a result of actuation of the clamping member 62 into the clamping position. By helping position the clamping member 62 in the pre-clamped position, the stops 76 may assist with keeping the clamping member out of the insertion path of the cable 50.

In some embodiments, the clamping member 62 may include a key portion 78 configured to limit rotation of the clamping member with respect to the longitudinal axis 48 during activation, such that the primary direction of travel of the clamping member is radial translation into the cable path, which corresponds with the longitudinal axis. The key portion 78 may be intended to be positioned ahead of a front end 80 (FIG. 3) of the actuator 64. The housing 30 may be configured with a corresponding keyed area 82 (FIG. 3) that interacts with the key portion 78 of the clamping member 62 to substantially inhibit rotation of the clamping member relative to the longitudinal axis 48.

Figure 6:
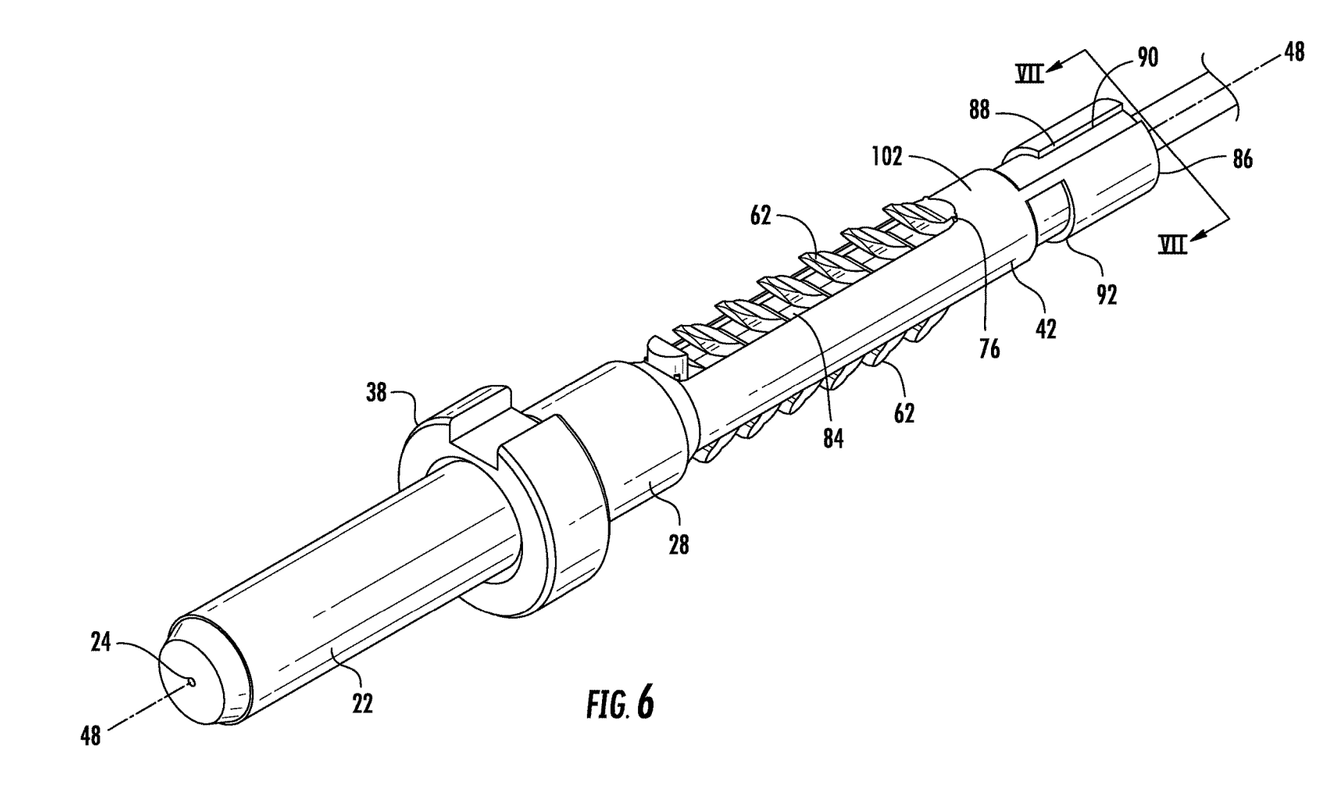
FIG. 6 is a perspective view of a partial assembly of the fiber optic connector of FIG. 1.
Figure 7:
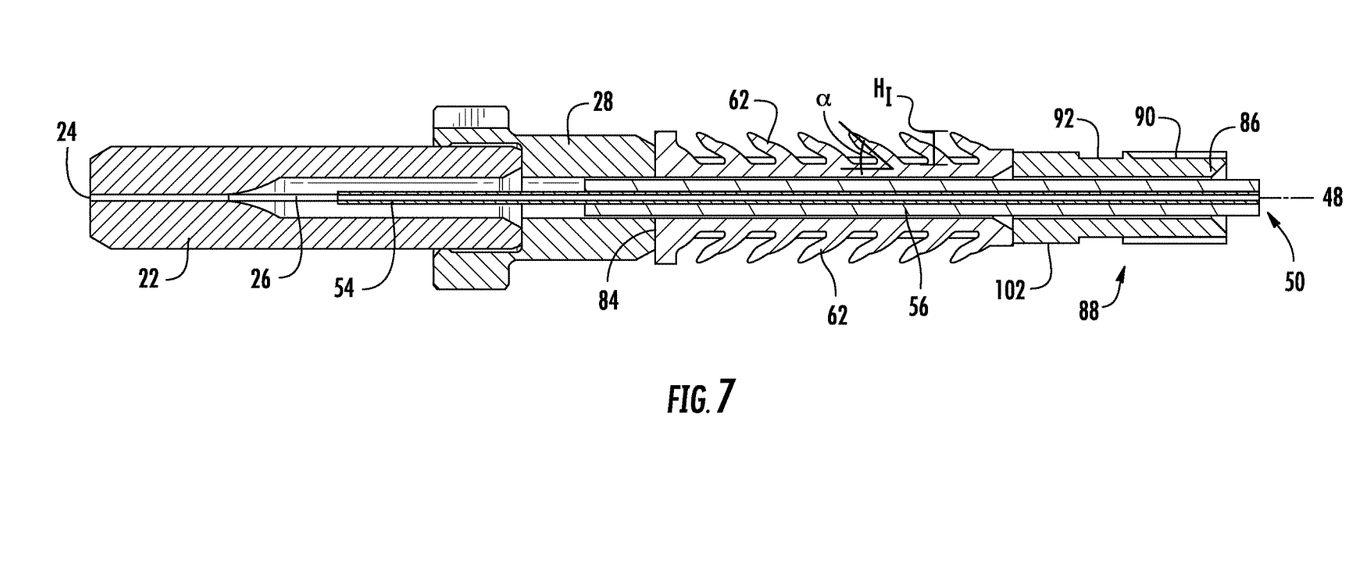
FIG. 7 is a longitudinal cross sectional view of the partial assembly of FIG. 6.

In an embodiment, shown in FIGS. 6 and 7, the clamping members 62 are respectively positioned at least partially within elongated slots 84 formed through the second portion 42 of the ferrule holder 28. Each elongated slot 84 is outwardly open and extends inwardly through the thickness of the ferrule holder 28. For each elongated slot 84 and its associated clamping member 62, the size and shape of the elongated slot 84 is configured to substantially match the footprint of the clamping member 62. The corresponding shape of the elongated slot 84 with the footprint of the clamping member 62 may help insure proper positioning of the clamping member within the connector 20. Particularly, the ferrule holder 28 may be designed such that the clamping member 62 is capable of moving perpendicular to the longitudinal axis 48, but substantially restricted from movement parallel to and rotationally about the longitudinal axis. The stops 76 of the clamping member 62 may initially engage or rest upon portions of the circumference of the elongated slot 84. The stops 76 may be located such that the clamping member 62 is supported at a position at least partially within a radial thickness of the elongated slots 84, but initially prevented from passing completely through the radial thickness until the clamping member 62 is acted upon by the actuator 64. The walls of the elongated slot 84 may have one or more fillets or other features configured in a manner that seeks to help avoid lock-up of the strain relief device 60 during assembly within the connector 20 and actuation thereof.

Staying with FIG. 6, a rearward end 86 of the ferrule holder 28 may also include one or more guide grooves 88 formed in an outer surface of the ferrule holder. The guide grooves 88 may be substantially L-shaped with a first leg 90 opening to the rearward end 86 of the ferrule holder 28 and a second leg 92 formed substantially perpendicular to the first leg. The guide grooves 88 may be configured to rotationally position the actuator 64 relative to the ferrule holder 28 during assembly, such that the actuator is properly initially installed in the unclamped position by following the first leg 90 of the guide grooves. The guide grooves 88 then guide rotation of the actuator 64 in the proper rotational direction and through the proper sweep angle to achieve the clamped position of the strain relief device 60.

Figure 9:
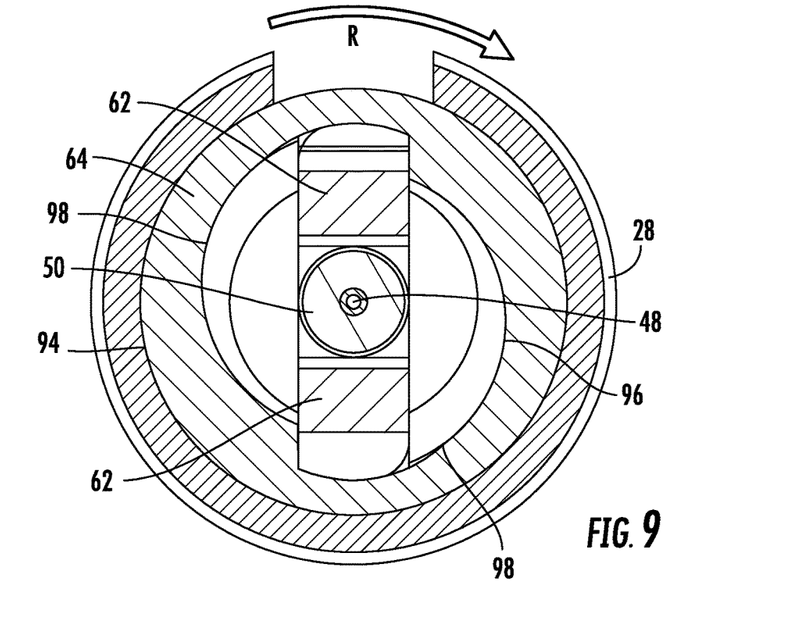
FIG. 9 is a cross sectional view of the assembly of FIG. 8 in an unclamped position.
Figure 10:
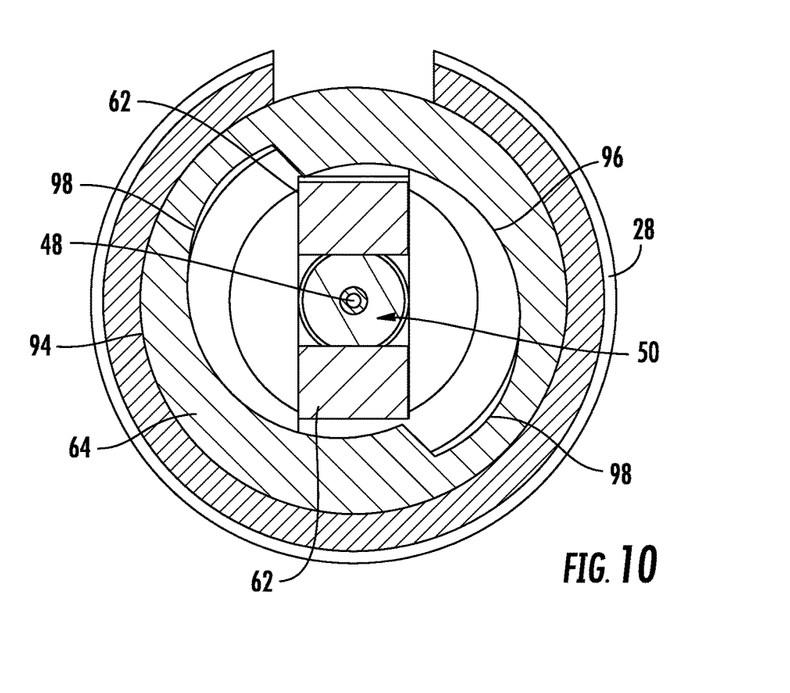
FIG. 10 is a cross sectional view of the assembly of FIG. 8 in a clamped position.

The actuator 64, sometimes called a cam, will now be described with reference to FIGS. 8-10. The actuator 64 may be a substantially rigid sleeve configured to fit at least partially around the second portion 42 of the ferrule holder 28, and at least partially around the one or more clamping members 62. The actuator 64 may have a generally cylindrical outer surface 94 configured to allow smooth insertion into the housing 30 and possibly allow rotation of the actuator 64 after being at least partially disposed within the housing. The actuator 64 has an internal actuation surface 96, shown in FIGS. 9 and 10. The internal actuation surface 96 is configured to provide the actuator 64 with a variable internal diameter as a function of the circumferential position around an actuator axis, e.g., corresponding with longitudinal axis 48. In one embodiment, the internal actuation surface 96 provides a "spiral-like" profile as shown in FIGS. 9 and 10. The spiral-like profile may be the result of two off-set and opposing elliptical surfaces 98. For example, each elliptical surface 98 may be formed as one-half of an ellipse, where a focus of each elliptical surface 98 substantially corresponds with the longitudinal axis 48. The pair of offset elliptical surfaces 98 are believed to reduce potential lateral dragging forces that may occur when the internal actuation surface 96 is rotated relative to the clamping member 62. Alternative profiles of the internal actuation surface 96, such as a full ellipse, or an oval, are also possible. In one embodiment, the internal actuation surface 96 extends from a front end 80 of the actuator 64 rearwardly along the inside of the sleeve that is the actuator. Beginning the internal actuation surface 96 at the front end of the actuator 64 allows the actuator to be slid over the clamping members 62 during assembly. In some embodiments, the internal actuation surface 96, e.g., the profile thereof, may run the full length of the actuator 64. In the illustrated embodiment, the internal actuation surface 96 does not cover the full length of the actuator 64.

Figure 12:
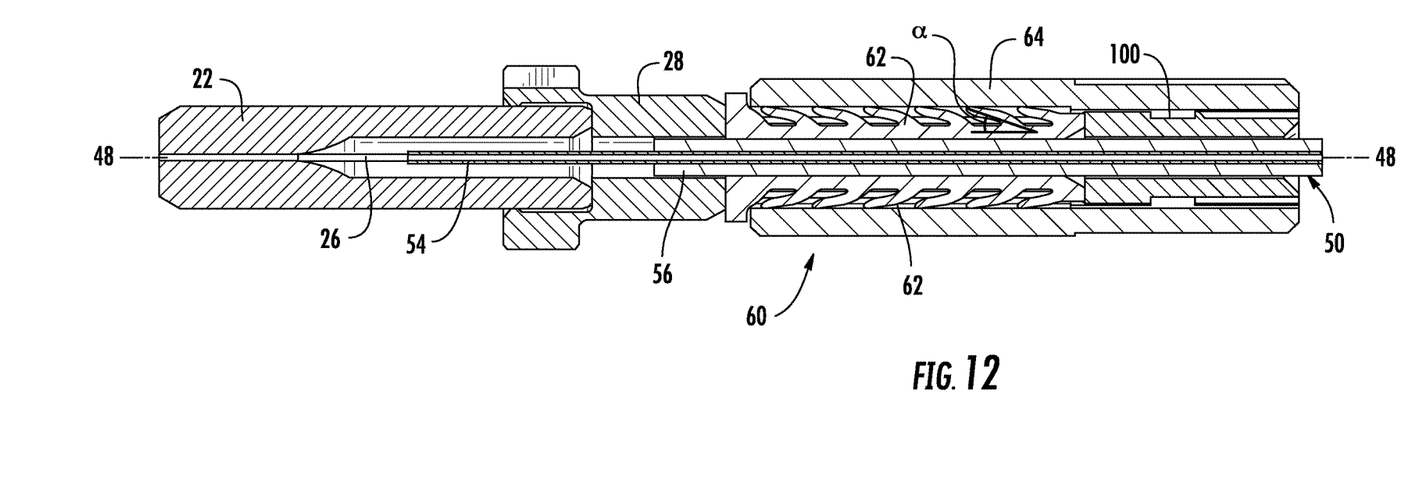
FIG. 12 is a longitudinal cross sectional view of the assembly of FIG. 8 in a clamped position around a relatively large cable.

A protrusion in the form of a guide rib 100, shown in FIGS. 11 and 12, may extend into the actuator 64. The guide rib 100 is configured to fit and slide within the guide groove 88 of the ferrule holder 28.

Having described the structure of various components of the strain relief device 60 according to a variety of embodiments, the assembly and operation of the strain relief device will now be further detailed.

As seen in FIGS. 6 and 7, the ferrule assembly, including the ferrule holder 28 having the elongated slots 84, may be fit with the pair of opposing clamping members 62. Use of three, or even more, clamping members 62 spaced substantially evenly around the circumference of the ferrule holder 28 may also be used. Use of a plurality of clamping members 62 may provide more symmetrical compression of the optical fiber 26 to inhibit bend induced attenuation and enable the optical fiber to lie along the longitudinal axis 48. Also, simultaneous use of two or more clamping members 62 is believed to provide more usable range of motion compared to the use of a single clamping member, which may help avoid causing plastic deformation of the spring arms 72. The orientation of the spring arms 72 having an initial angle α facing the ferrule 22 is believe to allow easier installation of the actuator 64 (see FIG. 8), but having the spring arms bent generally rearwardly or generally vertically is also within the scope of this disclosure.

Initially, the clamping members 62 protrude radially outwardly past the outer surface 102 of the ferrule holder 28 to enable engagement with the internal actuation surface 96 of the actuator 64. By rotationally aligning the guide rib 100 of the actuator 64 with the first leg 90 of the guide groove 88 of the ferrule holder 28, the actuator is able to be installed over the ferrule holder and the clamping members 62 with a sliding motion generally along the direction of the longitudinal axis 48. Alignment of the guide rib 100 with the first leg 90 may ensure that the actuator 64 is initially installed in the unclamped position shown in FIG. 9, where the clamping members 62 may extend outwardly to the portions of each elliptical surface 98 having the greatest distance from the longitudinal axis 48.

The cable 50 may then be inserted through the ferrule holder 28. Reiterating from above, the clamping members 62 may be substantially held outside of the cable path by the stops 76 of the clamping member 62 being supported by the elongated slot 84 of the ferrule holder as shown in FIG. 6.

Once the cable 50 is in place, the actuator 64 may be rotated relative to the longitudinal axis 48 (see arrow R in FIG. 9) as the guide rib 100 moves within the second leg 92 of the guide groove 88. As the actuator 64 rotates, the clamping members 62, which may be initially positioned relative to a maximum inner radius of the elliptical surfaces 98, are deformed and/or shifted radially inwardly as the clamping members encounter portions of the elliptical surfaces 98 with decreasing radii. Put another way, the clamping members 62 reside adjacent to the major axis of the respective elliptical surfaces 98 in the un-clamped position (see FIG. 9), and rotation of the actuator 64 causes the clamping members to reside adjacent to the minor axis of the respective elliptical surfaces 98 in the clamped position (see FIG. 10). The clamped position thus provides an interference fit among the internal actuation surface 96, the clamping members 62 and the cable 50.

The configuration of the offset elliptical surfaces 98 selected as the profile of the internal actuation surface 96 result in an approximately 135 degree rotation of the actuator 64 from the un-clamped position to the clamped position, wherein the direction of rotation is identified by arrow R in FIG. 9. The degree of rotation may be based on the profile of the internal actuation surface 96 and the number of clamping members 62 being used. For example, a 90 degree rotation may be sufficient for an oval shaped actuation surface acting upon a pair of clamping members 62. Rotating the actuator 64 through about 135 degrees may be beneficial compared to completing the clamping process with an approximate 90 degrees of rotation. The additional rotation used for the elliptical surfaces 98 results in a more gradual application of compressive forces, reducing the magnitude of maximum torque that may be felt by the clamping members 62. The increased degree of rotation is believed to provide consistent strain relief activation behavior and require less mechanical advantage, i.e., making the actuator 64 easier to turn during assembly by the installer.

Reiterating from above, the extent of deflection/deformation of the spring arms 72 is based on the size of the cable 50 selected for connection to the connector 20. Furthermore, the deflection of the spring arms 72 may provide the compensation within the system that allows for the strain relief device 60 to be acceptable for use with the relatively large range of cable diameters. Thus for small cable diameters (i.e., 200 um-250 um) as shown in FIG. 11, translation of the clamping members 62 toward the longitudinal axis 48 is large and deformation of the spring arms 72 is slight. In contrast, for large cable diameters (i.e., ~900 um) as shown in FIG. 12, translation of the clamping members 62 toward the longitudinal axis 48 is slight and deformation of the spring arms 72 is large. In each case, however, the strain relief device 60 provides a sufficient compression fit to retain the cable 50 substantially without signal attenuation that could be caused by over compression.

Those skilled in the art will appreciate that other modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents.

The invention claimed is:

1. A fiber optic connector, comprising:
  a ferrule configured to support at least one optical fiber of a fiber optic cable;
  a ferrule holder from which the ferrule extends; and
  a strain relief device comprising:
    at least one resilient clamping member configured to selectively apply a compressive force to at least a portion of the fiber optic cable, wherein the at least one resilient clamping member comprises:
      a base configured to be positioned substantially parallel with a longitudinal axis of the fiber optic cable, the base having a radially inner surface configured to face the fiber optic cable and a radially outer surface configured to face away from the fiber optic cable; and
      a plurality of spring arms resiliently extending from the radially outer surface of the base; and
    an actuator at least partially surrounding the ferrule holder and being configured to place the at least one resilient clamping member into compressed contact with the fiber optic cable thus retaining the fiber optic cable.

2. The fiber optic connector according to claim 1, wherein, in an initial position, the plurality of spring arms extend at an oblique angle relative to the radially outer surface.

3. The fiber optic connector according to claim 2, where in a clamped position, the spring arms are bent such that the oblique angle is within the range of about 5 degrees to about 30 degrees.

4. The fiber optic connector according to claim 1, wherein each of the plurality of spring arms is curved in an un-clamped position.

5. The fiber optic connector according to claim 1, wherein the at least one resilient clamping member further comprises:
  a plurality of protrusions extending from the radially inner surface, the plurality of protrusions being configured to contact the fiber optic cable.

6. The fiber optic connector according to claim 5, wherein the plurality of protrusions extend across a width of the base, and each of the plurality protrusions comprises a portion of a cylinder.

7. The fiber optic connector according to claim 1, wherein the at least one resilient clamping member comprises a pair of resilient clamping members configured to be positioned in radially opposite locations relative to the fiber optic cable.

8. A fiber optic connector, comprising:
  a ferrule configured to support at least one optical fiber of a fiber optic cable;
  a ferrule holder from which the ferrule extends; and
  a strain relief device comprising:
    at least one resilient clamping member configured to selectively apply a compressive force to at least a portion of the fiber optic cable, and
    an actuator at least partially surrounding the ferrule holder and being configured to place the at least one resilient clamping member into compressed contact with the fiber optic cable thus retaining the fiber optic cable;
  wherein:
    the ferrule holder comprises at least one elongated slot, and the at least one resilient clamping member is configured to reside at least partially within the elongated slot; and
    the elongated slot and the at least one resilient clamping member are configured to restrict rotation of the at least one resilient clamping member with respect to the ferrule holder.

9. The fiber optic connector according to claim 8, wherein the at least one resilient clamping member comprises one or more stops, the stops being positioned on a periphery of the at least one resilient clamping member, and wherein the one or more stops are supported by the elongated slot to at least temporarily maintain the at least one resilient clamping member out of a cable path through the ferrule holder.

10. The fiber optic connector according to claim 8, wherein:

the actuator comprises a sleeve at least partially surrounding the at least one resilient clamping member, and the sleeve is configured to compress the at least one resilient clamping member against the fiber optic cable in response to rotation of the sleeve relative to the ferrule holder.

11. The fiber optic connector according to claim 10, wherein:

the sleeve comprises an internal actuation surface, the internal actuation surface having two opposed elliptical portions such that a radius of the internal actuation surface varies.

12. The fiber optic connector according to claim 11, wherein rotating the sleeve approximately 135 degrees around the ferrule holder moves the actuator from an unclamped position to a clamped position while compressing the at least one resilient clamping member with the internal actuation surface of the sleeve.

13. A fiber optic cable assembly, comprising:

a fiber optic cable having at least one optical fiber;

the fiber optic connector according to claim 1 installed on the fiber optic cable.

14. The fiber optic cable assembly according to claim 13, wherein:

the fiber optic cable includes at least one of an acrylate coating with a diameter between about 200 um and about 250 um, and a tight buffer with a diameter of about 900 um; and the at least one resilient clamping member is capable of separately providing a friction fit with both the acrylate coating and the tight buffer within over-compression of the fiber optic cable.

15. A fiber optic connector, comprising:

a ferrule configured to support at least one optical fiber of a fiber optic cable;

a ferrule holder from which the ferrule extends; and a housing having a cavity in which the ferrule holder is received; and a strain relief device at least partially located within the housing, the strain relief device comprising:

a strain relief device comprising:

at least one resilient clamping member configured to selectively apply a compressive force to at least a portion of the fiber optic cable, wherein the at least one resilient clamping member comprises a plurality of spring arms that are curved in an un-clamped position; and an actuator at least partially surrounding the ferrule holder and being configured to place the at least one resilient clamping member into compressed contact with the fiber optic cable thus retaining the fiber optic cable within the housing, wherein the actuator is rotatable to place urge the plurality of spring arms from the un-clamped position to a clamped position, wherein the a plurality of spring arms that are urged towards the fiber optic cable in the clamped position.

16. The fiber optic connector according to claim 15, wherein the at least one resilient clamping member comprises a pair of resilient clamping members configured to be positioned in radially opposite locations relative to the fiber optic cable.

* * * * *